United States Patent [19]
Uenoyama et al.

[11] Patent Number: 5,851,851
[45] Date of Patent: *Dec. 22, 1998

[54] METHOD FOR FABRICATING A SEMICONDUCTOR ACCELERATION SENSOR

[75] Inventors: Hirofumi Uenoyama, Anjo; Masakazu Kanosue, Nagoya; Kenichi Ao, Tokai; Yasutoshi Suzuki, Okazaki, all of Japan

[73] Assignee: Nippondenso Co., Ltd., Kariya, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 399,342

[22] Filed: Mar. 6, 1995

[30]      Foreign Application Priority Data

Mar. 7, 1994  [JP]  Japan .................................. 6-036139
Mar. 7, 1994  [JP]  Japan .................................. 6-036141

[51] Int. Cl.$^6$ .................................................. H01L 21/78
[52] U.S. Cl. .................................. 438/50; 438/52; 438/53
[58] Field of Search ........................... 156/646.1, 656.1, 156/657.1, 662.1; 437/225, 226, 227, 228, 228 O, 228 H, 228 XU, 901, 921, 927; 361/283.4; 438/53

[56]      References Cited

U.S. PATENT DOCUMENTS

| | | | |
|---|---|---|---|
| 4,387,154 | 6/1983 | Whitmore | 430/202 |
| 4,894,698 | 1/1990 | Hijikigawa et al. | 357/26 |
| 5,013,693 | 5/1991 | Guckel et al. | 437/248 |
| 5,090,254 | 2/1992 | Guckel et al. | 73/862.59 |
| 5,202,281 | 4/1993 | Ishibashi | 437/51 |
| 5,274,269 | 12/1993 | Depuydt et al. | 257/744 |
| 5,314,572 | 5/1994 | Core et al. | 156/643 |
| 5,316,619 | 5/1994 | Mastrangelo | 156/644 |
| 5,326,726 | 7/1994 | Tsang et al. | |
| 5,447,067 | 9/1995 | Biebl et al. | 73/514.32 |
| 5,470,797 | 11/1995 | Mastrangelo | 437/225 |

FOREIGN PATENT DOCUMENTS

| | | |
|---|---|---|
| 480471 | 4/1992 | European Pat. Off. . |
| 61-212052 | 9/1986 | Japan . |
| 63-041855 | 2/1988 | Japan . |
| 1181446 | 7/1989 | Japan . |
| 4 42834 | 7/1992 | Japan . |
| 5095046 | 4/1993 | Japan . |
| 92 03740 | 3/1992 | WIPO . |

OTHER PUBLICATIONS

Payne et al: "Surface Micromachined Accelerometer: A Technology Update".
Core, et al: "Fabrication Technology for an Intergrated Surface–Micromachined Sensor", Solid State Technology, Oct. 1993, pp. 39–47.
Guckel, et al: "The Application of Fine–grained, Tensil Polysilicon to Mechanically Resonant Transducers" Senors and Actuators, a21–a23 (1990) 346–351.
Guckel: "Surface Micromachines Pressure Transducers", Sensors and Actuators, 28 (1991) 133–146.
Burns, et al: "Thin Films for Micromechanical Sensors", J.Var.Sci.Technol. A 8 (4) Jul./Aug. 1990 1990 American Vacuum Society, pp. 3606–3613.
Wolf, Stanley "Silicon Processing for the VLSI Era", vol. 1, pp. 407–409, 518, 564. (1986).

Primary Examiner—Charles Bowers
Assistant Examiner—Matthew Whipple
Attorney, Agent, or Firm—Pillsbury Madison & Sutro LLP

[57]      ABSTRACT

It is an object to provide a method of fabrication for a semiconductor acceleration sensor which can prevent destruction of a movable portion during dicing. A sacrificial layer composed of silicon oxide film is formed on a silicon substrate, and a movable member composed of polycrystalline silicon is formed on the sacrificial layer. A polyimide film is applied on the movable member at room temperature and heated to approximately 350° C. to harden. The movable member is supported by this polyimide film. Accordingly, etching liquid penetration holes are formed on the polyimide film. Further, the sacrificial layer disposed between the movable member and the silicon substrate is etched away by means of dipping the silicon substrate into hydrofluoric acid-based etching liquid. Thereafter, the silicon substrate is dipped into demineralized water to replace the etching liquid with demineralized water, and subsequently the silicon substrate is dried. Accordingly, the silicon substrate is diced and thereafter the polyimide film is etched away by $O_2$ ashing.

18 Claims, 15 Drawing Sheets

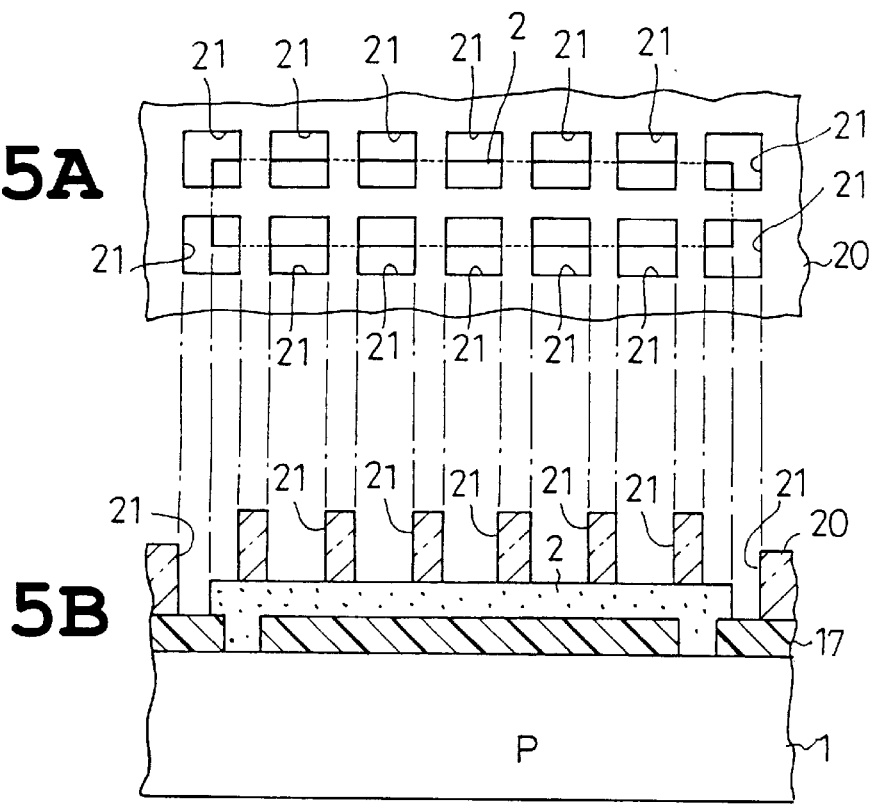
FIG. 5A
FIG. 5B
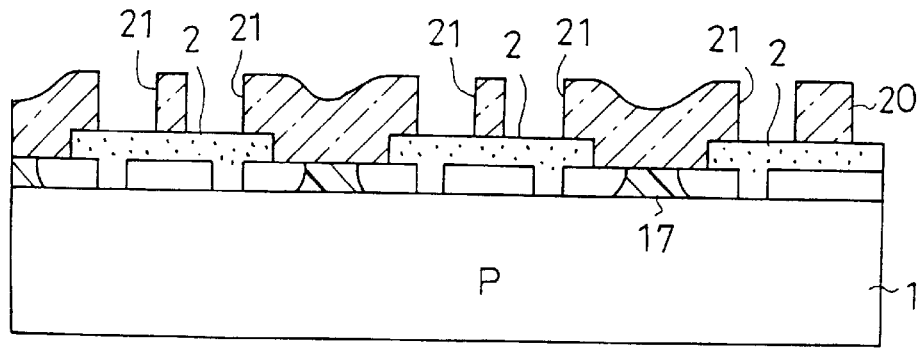
FIG. 6

METHOD FOR FABRICATING A SEMICONDUCTOR ACCELERATION SENSOR

CROSS REFERENCE TO RELATED APPLICATION

This application is based upon and claims the benefit of priority of the prior Japanese Patent applications No. 6-36139 filed on Mar. 7, 1994 and No. 6-36141 filed on Mar. 7, 1994, the contents of which are incorporated herein by reference.

BACKGROUND OF THE INVENTION

1. Field of the Invention:

The present invention relates to a method for fabricating a semiconductor acceleration sensor.

2. Related Arts:

Recently, demand has grown for a semiconductor acceleration sensor of greater compactness and lower cost. To this end, a differential-capacitance type semiconductor acceleration sensor employing polycrystalline silicon as an electrode was disclosed in PCT WO 92/03740. A sensor of this type is described in FIGS. 20 and 21. FIG. 20 indicates a plan view of the sensor, and FIG. 21 is a sectional view taken along line XXI—XXI of FIG. 20.

A movable portion 30 of beam structure is disposed at a specified interval above a silicon substrate 29. The movable portion 30 composed of polycrystalline silicon comprises anchor regions 31, 32, 33 and 34, beam regions 35 and 36, a weight (mass) region 37, and a movable electrode region 38. The beam regions 35 and 36 extend from the anchor regions 31, 32, 33, and 34 of the movable portion 30, and the weight (mass) portion 37 is supported by these beam regions 35 and 36. The movable electrode region 38 is formed on a portion of this weight (mass) region 37. Two fixed electrodes 39 are disposed on the silicon substrate 29 so as to oppose with respect to one movable electrode region 38. Accordingly, the structure is such that in a case of acceleration applied in a direction parallel to the surface of the silicon substrate 29 (indicated by G in FIG. 20), electrostatic capacitance between the movable electrode portion 38 and the fixed electrodes 39 increases on one side and decreases on the other.

In fabrication of this sensor, as shown in FIG. 22, a sacrificial layer 40 of silicon oxide film or the like is formed on the silicon substrate 29, and along with this via holes 41 are formed in the sacrificial layer 40 at places which become anchor regions. Thereafter, as shown in FIG. 23, a polycrystalline silicon film which becomes the movable portion 30 is deposited on the sacrificial layer 40 and configured in the specified pattern. In continuation, as shown in FIG. 24, resist 43 is disposed on a peripheral circuitry formation region on the silicon substrate 29. Accordingly, as shown in FIG. 25, the sacrificial layer 40 below the movable portion 30 is etched with a hydrofluoric acid-based etching liquid with the resist 43 as a mask, and the movable region 30 is disposed atop the silicon substrate 29 at a specified interval. Finally, as shown in FIG. 26, the resist 43 is etched by using etching liquid.

SUMMARY OF THE INVENTION

When the above-described semiconductor acceleration sensor was actually fabricated, however, it was discovered that the movable portion 30 of the semiconductor acceleration sensor was destroyed during the fabrication process.

It is an object of the present invention to provide a method of fabrication which can prevent a movable portion of a semiconductor acceleration sensor from being destroyed during the fabrication process.

According to experimentation by the inventors, it was discovered, firstly, that destruction of the movable region occurs in the dicing step, which cuts the sensor chip from the wafer. That is to say, in a semiconductor acceleration sensor of this type, the spring coefficient of the beam is lowered and the weight (mass) region is enlarged in order to boost sensitivity. For this reason, there is weakness with respect to outside force, and the movable portion is caused to be destroyed by the flow and pressure of the cutting water in the dicing step.

Accordingly, according to the present invention, firstly, it is a first object to provide a method for fabricating a semiconductor acceleration sensor which can prevent destruction susceptible to occurrence when dicing.

For this purpose, a method of fabrication according to a first aspect of the present invention is a fabrication method of a semiconductor acceleration sensor provided with a semiconductor substrate and a movable portion of beam structure disposed at a specified interval upon the semiconductor substrate such that acceleration is detected from displacement of the movable portion accompanying the action of acceleration, characterized in that a movable portion support film is disposed on the movable portion, the semiconductor substrate is diced in a state wherein the movable portion is supported by the movable portion support film, and the movable portion support film is thereafter etched.

In particular, a sacrificial layer disposed between the movable portion and the semiconductor substrate is etched by etching liquid, and etching of the movable portion support film after dicing is performed with a dry process.

Thermosetting resin can be employed as the foregoing movable portion support film. In this case, it is acceptable to dispose the resin on the movable portion at less than the hardening temperature, and harden at the hardening temperature so as to support the movable portion.

That is to say, according to a first aspect of the present invention, the semiconductor substrate is diced in a state wherein the movable portion is supported by the movable portion support film. At the time of this dicing, the movable portion is supported by the movable portion support film, and so destruction of the movable portion by means of the flow and pressure of the cutting water is prevented. The movable portion support film can be etched after dicing. Herein, if this etching is performed by a dry process, destruction of the movable portion during etching can be prevented.

Secondly, according to what has been learned by the inventors, the movable portion is destroyed in the step to make the movable portion movable, i.e., the sacrificial etching step.

This point will be described in detail hereinafter.

There is a chance of destruction of the movable portion 30 in the step to etch the sacrificial layer 40 below the movable portion 30 (FIG. 25). Briefly, as shown in FIG. 27, the silicon substrate 29 is dipped into etching liquid 44, and after etching of the sacrificial layer 40 is performed, the silicon substrate 29 is dipped into demineralized water 45, as shown in FIG. 28, and etching liquid adhering to the surface of the silicon substrate 29 is replaced with demineralized water. Furthermore, the silicon substrate 29 is removed from the demineralized water 45 and dried. At this time, as shown in FIG. 29, demineralized water 45 remains between the silicon substrate 29 and the movable portion 30, and the movable portion 30 is pulled to the surface of the silicon substrate 29 by means of the surface tension of this demineralized water. As a result of this as shown in FIG. 30, the movable portion is destroyed.

Additionally, an etching liquid is normally employed in the etching of the resist after the etching of the sacrificial layer 40. Destruction of the movable portion 30 may similarly occur when this etching liquid is replaced with demineralized water and the demineralized water is dried.

Accordingly, it is a second object of the present invention to provide a method for fabrication of a semiconductor acceleration sensor which can prevent destruction of a movable portion at the time of etching of a sacrificial layer.

For this reason, a second aspect according to the present invention is a fabrication method of a semiconductor acceleration sensor provided with a semiconductor substrate and a movable portion of beam structure disposed at a specified interval upon the semiconductor substrate such that acceleration is detected from displacement of the foregoing movable portion accompanying the action of acceleration, characterized by a first step for forming a sacrificial layer on the semiconductor substrate as well as forming a movable portion on the sacrificial layer, a second step for disposing in a specified region on the semiconductor substrate a mask member composed of material having acid-resisting characteristics and also etchable by a dry process, a third step for etching the sacrificial layer below the movable portion by means of acidic etching liquid in a state of masking by means of the mask member, a fourth step for replacing the acidic etching liquid with a sublimate material as well as causing the sublimate material to be sublimated, and a fifth step for etching the mask member by a dry process.

The specified region masked by the mask member is other than the region for forming sensor elements, for example a peripheral circuitry formation region. Additionally, it is also acceptable to jointly employ a movable portion support film disposed also on the movable portion, as in the foregoing first aspect. In this case, the mask member may be etched after dicing.

A polyimide can be utilized as the mask member, and paradichlorbenzene or naphthalin can be utilized as the sublimate material.

According to the second aspect of the present invention, a mask member composed of material having acid-resisting characteristics and also etchable by a dry process is disposed in a specified region on the semiconductor substrate by means of the second step. Accordingly, by means of the third step, the sacrificial layer below the movable portion is etched by acidic etching liquid in a state of masking by means of the mask member. The mask member has acid-resisting characteristics and so the region masked by the mask member is reliably protected from the acidic etching liquid at this time.

Additionally, by means of the fourth step, the acidic etching liquid is replaced with sublimate material and the sublimate material is sublimated. In a case wherein the etching liquid is replaced with demineralized water and dried at this time, the movable portion may have been pulled toward the semiconductor substrate by means of the surface tension of demineralized water remaining between the movable portion and semiconductor substrate, thereby destroying the movable portion. According to the present invention, however, the etching liquid is replaced with sublimate material and the sublimate material is sublimated, and so destruction of the movable portion is avoided.

Moreover, by means of the fifth step, the mask member is etched by a dry process. Accordingly, in a case wherein etching of the mask member is performed with a wet process, the movable portion may have been pulled toward the semiconductor substrate by means of the surface tension of demineralized water remaining between the movable portion and semiconductor substrate when the etching liquid is replaced with demineralized water and dried, thereby destroying the movable portion. According to the present invention, however, the mask member is etched by a dry process, and so destruction of the movable portion is avoided.

BRIEF DESCRIPTION OF THE DRAWINGS

These and other objects, features and characteristics of the present invention will be appreciated from a study of the following detailed description, the appended claims, and drawings, all of which form a part of this application. In the drawings:

FIG. 4, FIGS. 5A and 5B, and FIGS. 6 to 8 are views used for explaining fabrication steps of the first embodiment;

DETAILED DESCRIPTION OF THE PRESENTLY PREFERRED EXEMPLARY EMBODIMENTS (First Embodiment)

A specific first embodiment according to a first aspect of the present invention will be described hereinafter with reference to the drawings.

Figure 1:
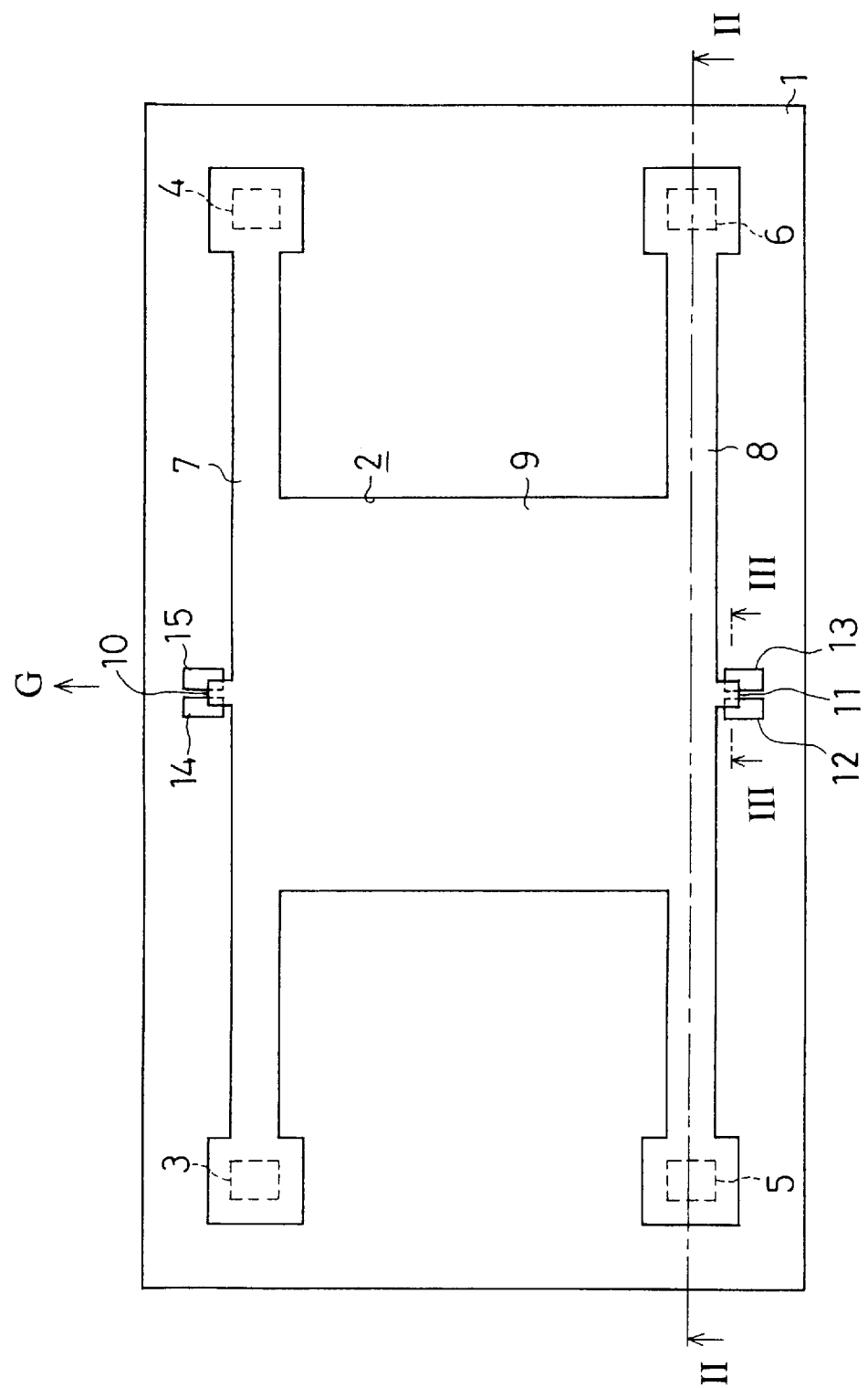
FIG. 1 is a plan view of a semiconductor acceleration sensor according to a first embodiment.
Figure 2:
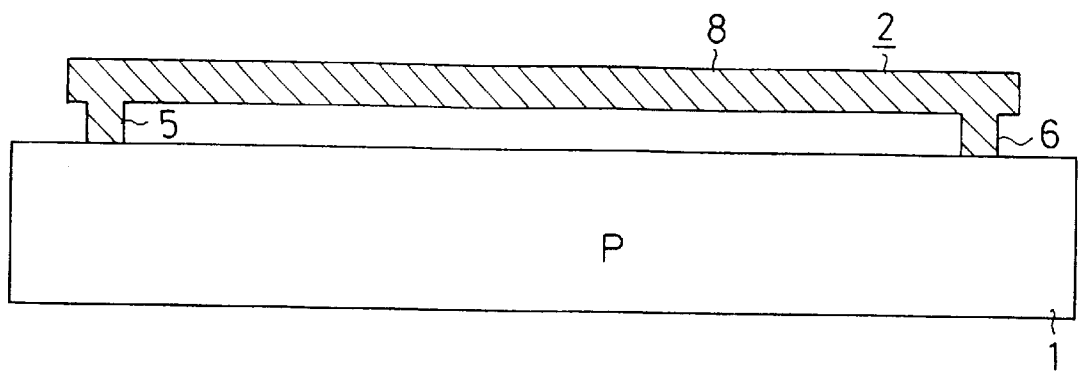
FIG. 2 is a sectional view taken along line II—II of FIG. 1.
Figure 3:
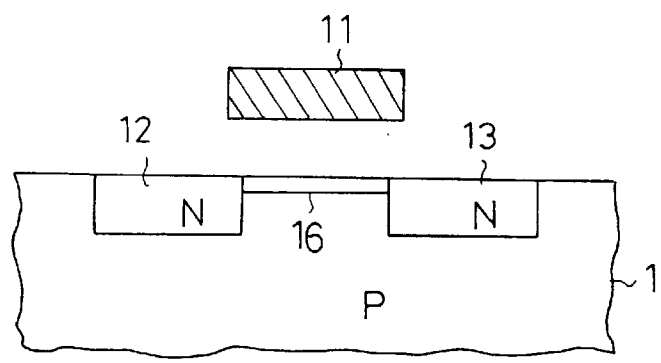
FIG. 3 is a sectional view taken along line III—III of FIG. 1.

FIG. 1 indicates a plan view of a semiconductor acceleration sensor according to this embodiment. Additionally, FIG. 2 is a II—II sectional view of FIG. 1, and FIG. 3 is a III—III sectional view of FIG. 1.

This embodiment is of a MIS transistor type semiconductor acceleration sensor.

A movable member 2 composed of polycrystalline silicon is provided on a top surface of a p-type silicon substrate 1 as a semiconductor substrate. This movable member 2 comprises anchor sections 3, 4, 5, and 6, beam sections 7 and 8, a weight (mass) section 9, and movable electrode sections 10 and 11.

More specifically, the four anchor sections 3, 4, 5, and 6 protrude from the silicon substrate 1. Accordingly, a beam section 7 of belt configuration extends over the silicon substrate 1 with a specified gap interposed therebetween so as to connect the anchor section 3 and the anchor section 4. Additionally, a beam section 8 of belt configuration extends over the silicon substrate 1 with a specified gap interposed therebetween so as to connect the anchor section 5 and the anchor section 6. The square weight section 9 is disposed at the central portion of the two beam sections 7 and 8 and suspended by the two beam sections 7 and 8 at a specified gap over the silicon substrate 1.

Moreover, the movable electrode section 10 protrudes from the central portion of the beam section 7. Similarly, the movable electrode section 11 protrudes from the central portion of the beam section 8. As is shown in FIG. 3, fixed electrodes 12 and 13 composed of an impurity diffusion region are formed on the surface of the silicon substrate 1, corresponding to both sides of the movable electrode section 11; these fixed electrodes 12 and 13 are formed by introducing n-type impurities into the silicon substrate 1 by means of ion implantation or the like. Similarly, as shown in FIG. 1, fixed electrodes 14 and 15 composed of an impurity diffusion region are formed on the surface of the silicon substrate 1, corresponding to both sides of the movable electrode section 11.

Additionally, as shown in FIG. 3, an inversion layer 16 is formed between the fixed electrodes 12 and 13 on the silicon substrate 1; this inversion layer 16 is produced by applying voltage between the silicon substrate 1 and the movable electrode section 11. Similarly, an inversion layer (not illustrated) is formed between the fixed electrodes 14 and 15 on the silicon substrate 1 as well, and this inversion layer is produced by applying voltage between the silicon substrate 1 and the movable electrode section 10.

Operation of the acceleration sensor will be described hereinafter.

When voltage is applied between the movable member 2 (movable electrode sections 10 and 11) and the silicon substrate 1 along with applying voltage between the fixed electrodes 12 and 13 and between the fixed electrodes 14 and 15, the inversion layers 16 are formed and currents flow between the fixed electrodes 12 and 13 and between the fixed electrodes 14 and 15. In a case wherein acceleration sensor receives acceleration and the movable member 2 is displaced in direction G indicated in FIG. 1 (i.e., a direction parallel to the surface of the silicon substrate 1), the surface areas of the inversion layer regions between the fixed electrodes 12 and 13 and between the fixed electrodes 14 and 15 (the gate width in transistor terms) change. As a result of this, the current flowing through the fixed electrodes 12 and 13 decreases, and the current flowing through the fixed electrodes 14 and 15 conversely increases. Acceleration is detected by means of measuring these currents between the fixed electrodes.

Next, fabrication steps of a semiconductor acceleration sensor structure will be described utilizing FIGS. 4 to 8.

Figure 4:
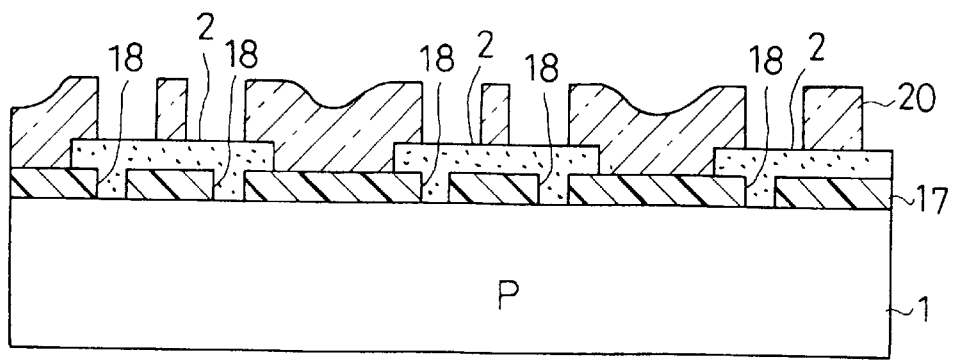

As is shown in FIG. 4, a p-type silicon substrate 1 is prepared and a sacrificial layer 17 composed of silicon oxide film is formed on the silicon substrate 1 by the chemical vapor deposition or spatter process and, along with this, via holes 18 are formed on the sacrificial layer 17 at places which will become anchor sections. Thereafter, polycrystalline silicon film which becomes the movable member 2 is deposited on the sacrificial layer 17 and is patterned into the configuration of the movable member 2 indicated in FIG. 1. Furthermore, polyimide film 20 (polyimide; hardening temperature 350° C.) is applied at room temperature on the movable member 2 (polycrystalline silicon film) as a movable member support film, and is heated to approximately 350° C. and hardened. As a result of this, the movable member 2 is supported by the polyimide film 20.

Accordingly, only places on the polyimide film 20 whereat etching of the sacrificial layer 17 is desired are opened. That is to say, as shown in FIGS. 5A and 5B, etching liquid penetration holes 21 are formed in lattice configuration with respect to the polyimide film 20. The etching liquid penetration holes 21 are square in shape, and the end of the movable member 2 (polycrystalline silicon film) is positioned inside the etching liquid penetration holes 21.

In continuation, as shown in FIG. 6, the sacrificial layer 17 between the movable member 2 and the silicon substrate 1 is etched away with hydrofluoric acid-based etching liquid. At the time of this etching, etching liquid penetrates from the etching liquid penetration holes 21 of the polyimide film 20 and the sacrificial layer 17 between the movable member 2 and the silicon substrate 1 is etched.

Figure 27:
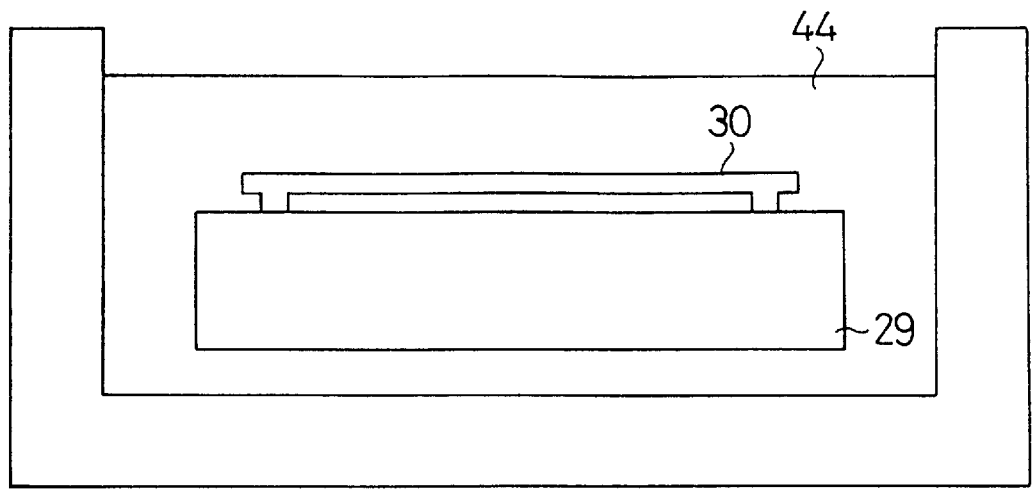
FIGS. 27 and 28 are views for explaining a sacrificial layer etching step.
Figure 28:
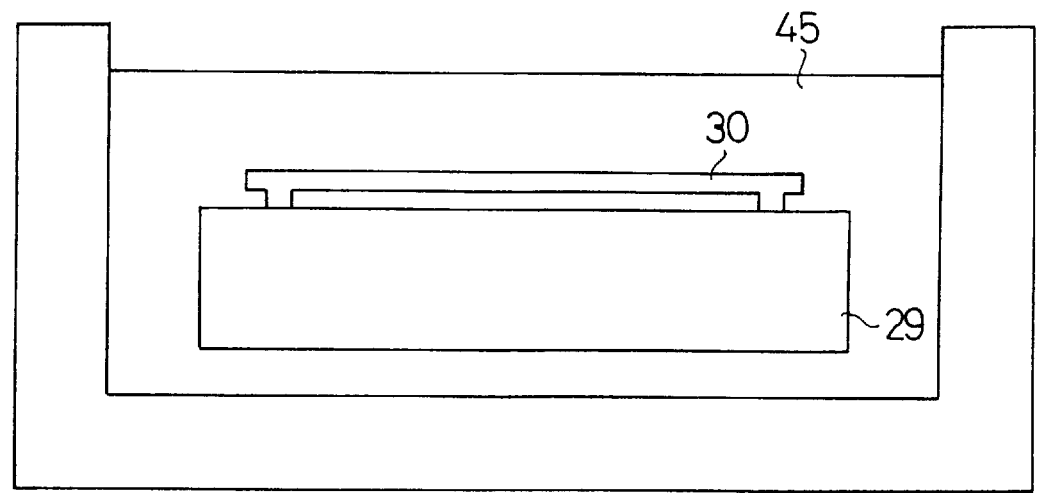
Figure 29:
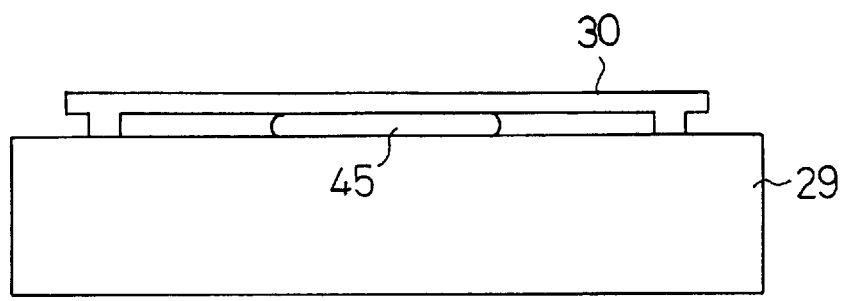
FIGS. 29 and 30 are views for indicating problem points.
Figure 30:
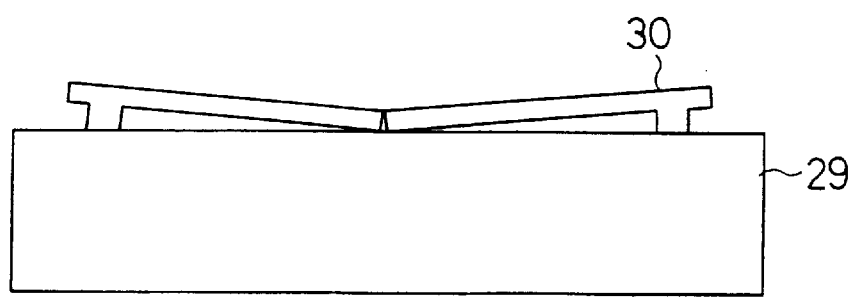

To describe this etching step in detail, as shown in FIG. 27, the silicon substrate 1 (29) is dipped into hydrofluoric acid-based etching liquid 44 and performs etching of the sacrificial layer 17. When etching is finished, as shown in FIG. 28, the silicon substrate 1 (29) is dipped into demineralized water 45 as wash liquid, and etching liquid adhering to the surface of the silicon substrate 1 (29) is replaced with demineralized water. Furthermore, the silicon substrate 1 (29) is removed from the demineralized water and dried. At this time, as shown in FIG. 29, demineralized water 45 remains between the silicon substrate 1 (29) and the movable member 2 (30), and the movable portion 30 is pulled to the surface of the silicon substrate 29 by means of the surface tension of this demineralized water, as shown in FIG. 30. As a result of this, the movable portion is destroyed.

According to this embodiment, however, polyimide film 20 is disposed on the top of the movable member 2 (FIG. 6) and this polyimide film 20 supports the movable member 2 from above, and so deformation of the movable member 2 during drying of demineralized water in the etching step is prevented and destruction of the movable member 2 is avoided.

Figure 7:
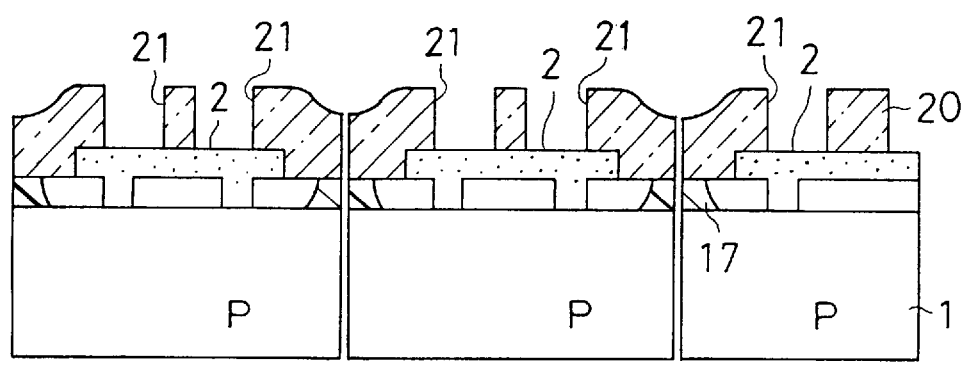

Next, dicing of the silicon substrate 1 is performed after etching, as shown in FIG. 7. The flow and pressure of cutting water are applied to the movable member 2 during the dicing, but because the polyimide film 20 supports the movable member 2 at this time as well, destruction of the movable member 2 is prevented.

Figure 8:
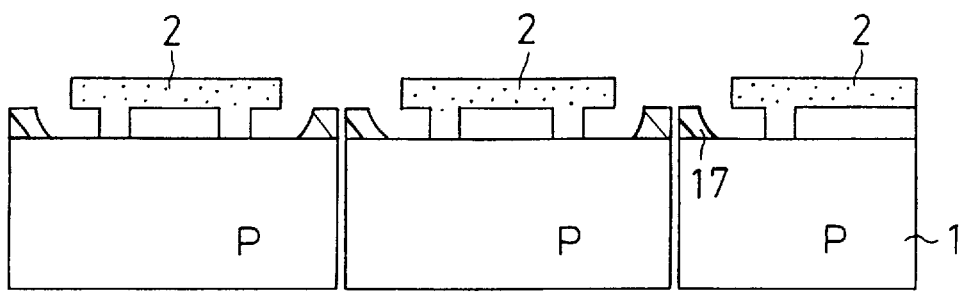

After dicing, as shown in FIG. 8, the polyimide film 20 is removed by means of 02 ashing. That is to say, the polyimide film 20 is etched by a dry process without employing etching liquid. If a wet process were employed, during drying after replacing etching liquid with demineralized water there would be a chance of the movable member 2 being pulled toward the surface of the silicon substrate 1 by means of the surface tension of demineralized water, thereby destroying the movable member 2 as shown in FIG. 30. According to the embodiment, however, because the polyimide film 20 is etched by a dry process, destruction of the movable member 2 is avoided.

According to this embodiment, polyimide film 20 (movable member support film) is disposed on the movable member 2, the silicon substrate 1 is diced in a state wherein the movable member 2 is supported by the polyimide film 20, and thereafter the polyimide film 20 is etched. Accordingly, because the movable member 2 is supported by the polyimide film 20 during dicing, destruction of the movable member 2 due to flow and pressure of the cutting water is prevented.

In addition, polyimide film 20 is disposed on the movable member 2 and the movable member 2 is supported by the polyimide film 20, and the sacrificial layer 17 disposed between the movable member 2 and the silicon substrate 1 is etched using hydrofluoric acid-based etching liquid 22. Accordingly, in the etching step of the sacrificial layer 17 by means of the etching liquid 22, replacement of the etching liquid 22 with demineralized water 23 (wash liquid) is performed and the movable member 2 may be drawn toward the silicon substrate 1 by means of surface tension of demineralized water 23 remaining between the movable member 2 and the silicon substrate 1, but because the movable member 2 is supported by the polyimide film 20, deformation of the movable member 2 is suppressed and destruction of the movable member 2 is avoided.

Furthermore, after dicing of the silicon substrate 1, the polyimide film 20 is etched by a dry process. Accordingly, in a case wherein this etching of the polyimide film 20 is performed with a wet process, replacement of the etching liquid with wash liquid is performed, there is a chance of the movable member 2 being drawn toward the silicon substrate 1 by means of surface tension of wash liquid remaining between the movable member 2 and the silicon substrate 1 at the time of drying of the wash liquid, leading to destruction of the movable member 2. However, because the polyimide film 20 is etched by a dry process, destruction of the movable member 2 is prevented.

Additionally polyimide film 20 which is a thermosetting resin is employed as the movable member support film, the polyimide film 20 is disposed on the movable member 2 at room temperature less than the hardening temperature thereof (350° C.) and is caused to harden at the hardening temperature so as to support the movable member 2. Accordingly, support of the movable member 2 is made reliable.

Moreover, etching liquid penetration holes 21 of lattice configuration are formed on the polyimide film 20 (movable member support film), and etching liquid is caused to penetrated from the etching liquid penetration holes 21 so as to etch away the sacrificial layer 17, and so etching of the sacrificial layer can be performed reliably. Additionally, if the lattice width of the polyimide film 20 which is left by penetration hole formation is made narrow while maintaining the strength required for dicing, it is possible to complete the sacrificial layer etching rapidly.

(Second Embodiment)

Next, a second embodiment will be described with a focus on points of difference from the first embodiment.

According to the first embodiment, a polyimide film 20 was formed prior to etching the sacrificial layer 17, but according to the present embodiment a polyimide film 20 is formed on the movable member 2 subsequently to etching the sacrificial layer 17. Then, dicing of the silicon substrate 1 is performed. The movable member 2 is supported by the polyimide film 20 at this time, and destruction of the movable member 2 due to flow and pressure of the cutting water is prevented.

After dicing of the silicon substrate 1, the polyimide film 20 can be etched by means of 02 ashing.

According to this embodiment, by means of forming the polyimide film 20 on the movable member 2 after etching the sacrificial layer 17, there is no need to form etching liquid penetration holes 21 in the polyimide film 20, and the number of steps can be reduced.

Additionally, a first aspect of the present invention is not exclusively limited to the above-described respective embodiments; for example as the material of the sacrificial layer, PSG or BSG or BPSG is also acceptable instead of silicon oxide film. Furthermore, as the material of the movable member, amorphous silicon or noncrystalline silicon or monocrystalline silicon is also acceptable instead of polycrystalline silicon. Moreover, as the etching liquid, other acidic etching liquids are also acceptable instead of hydrofluoric-acid based etching liquid.

Furthermore, the polyimide film 20 as the movable member support film can also employ, in addition, a thermosetting resin of resist or the like.

Figure 20:
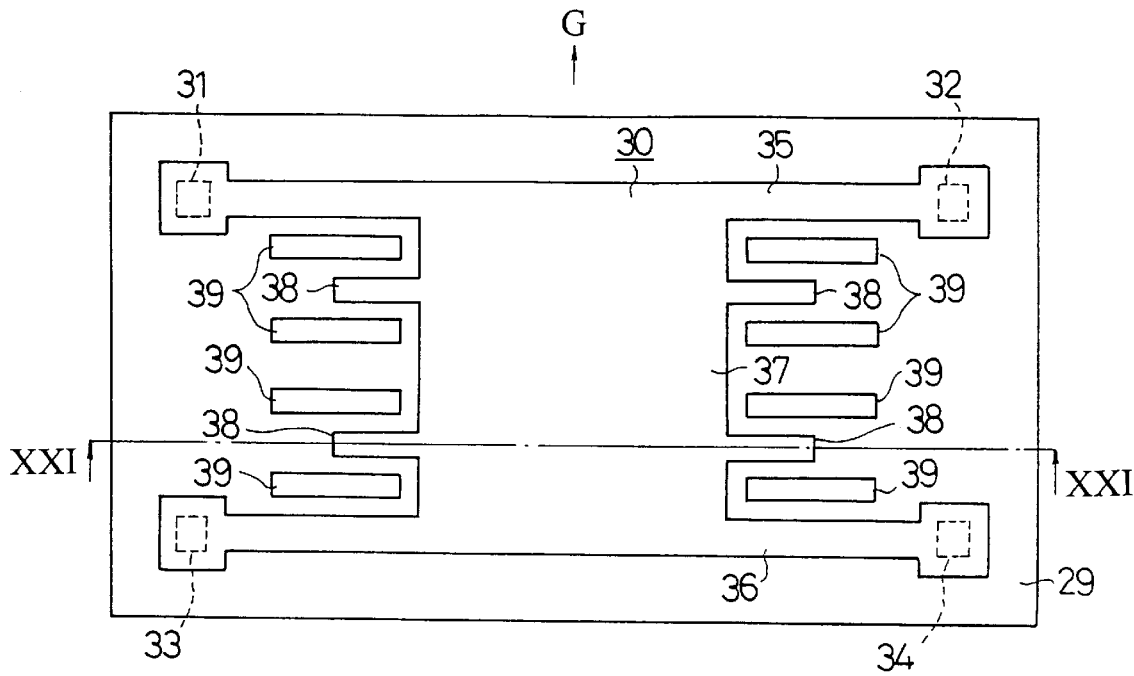
FIG. 20 is a plan view of a conventional semiconductor acceleration sensor.
Figure 21:
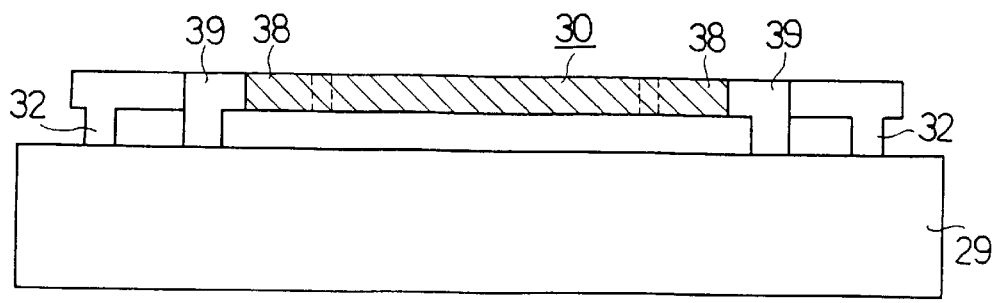
FIG. 21 is a sectional view taken along line XXI—XXI of FIG. 20.
Figure 22:
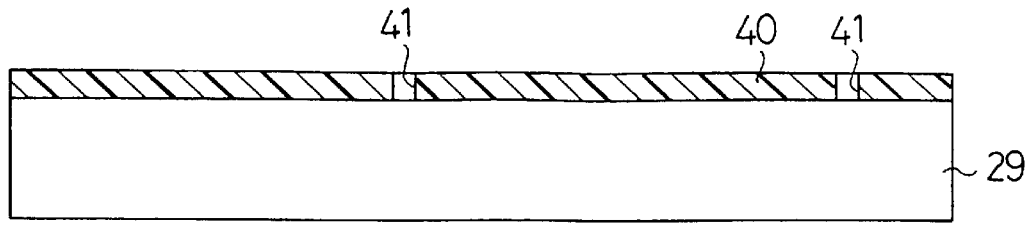
FIGS. 22 to 26 are sectional views accompanying a description of a method of fabrication according to the related art.
Figure 23:
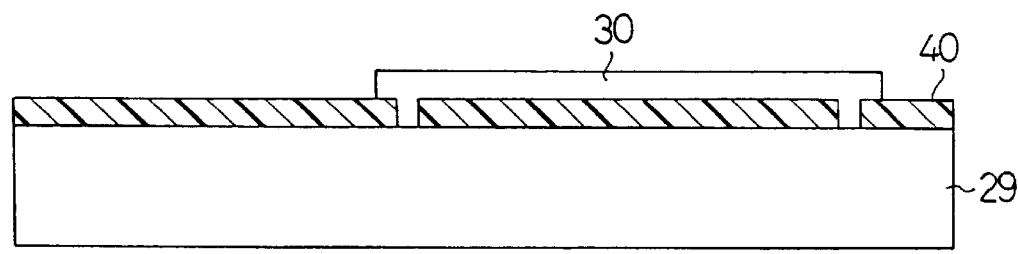
Figure 24:
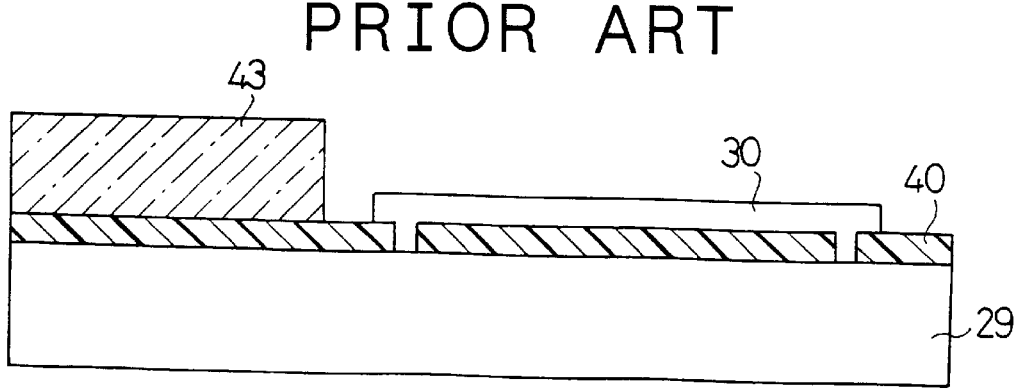
Figure 25:
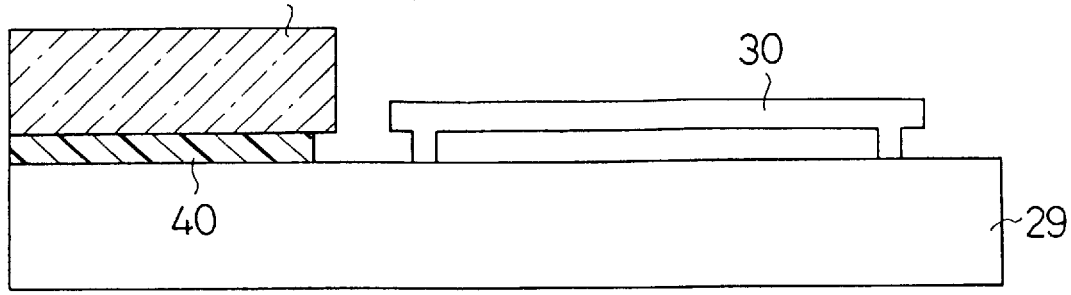
Figure 26:
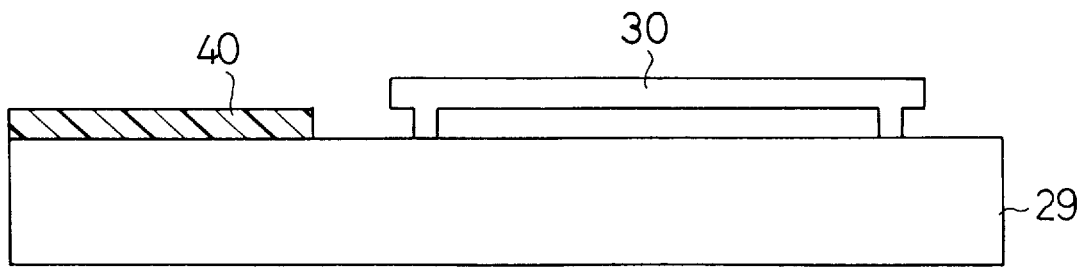

Still further, the above-described embodiment is of a specific MIS transistor type semiconductor acceleration sensor, but specific embodiment in the differential-capacitance type acceleration sensor indicated in FIG. 20 is also acceptable.

(Third Embodiment)

A specific third embodiment according to a second aspect of the present invention will be described hereinafter with reference to the drawings.

Figure 9:
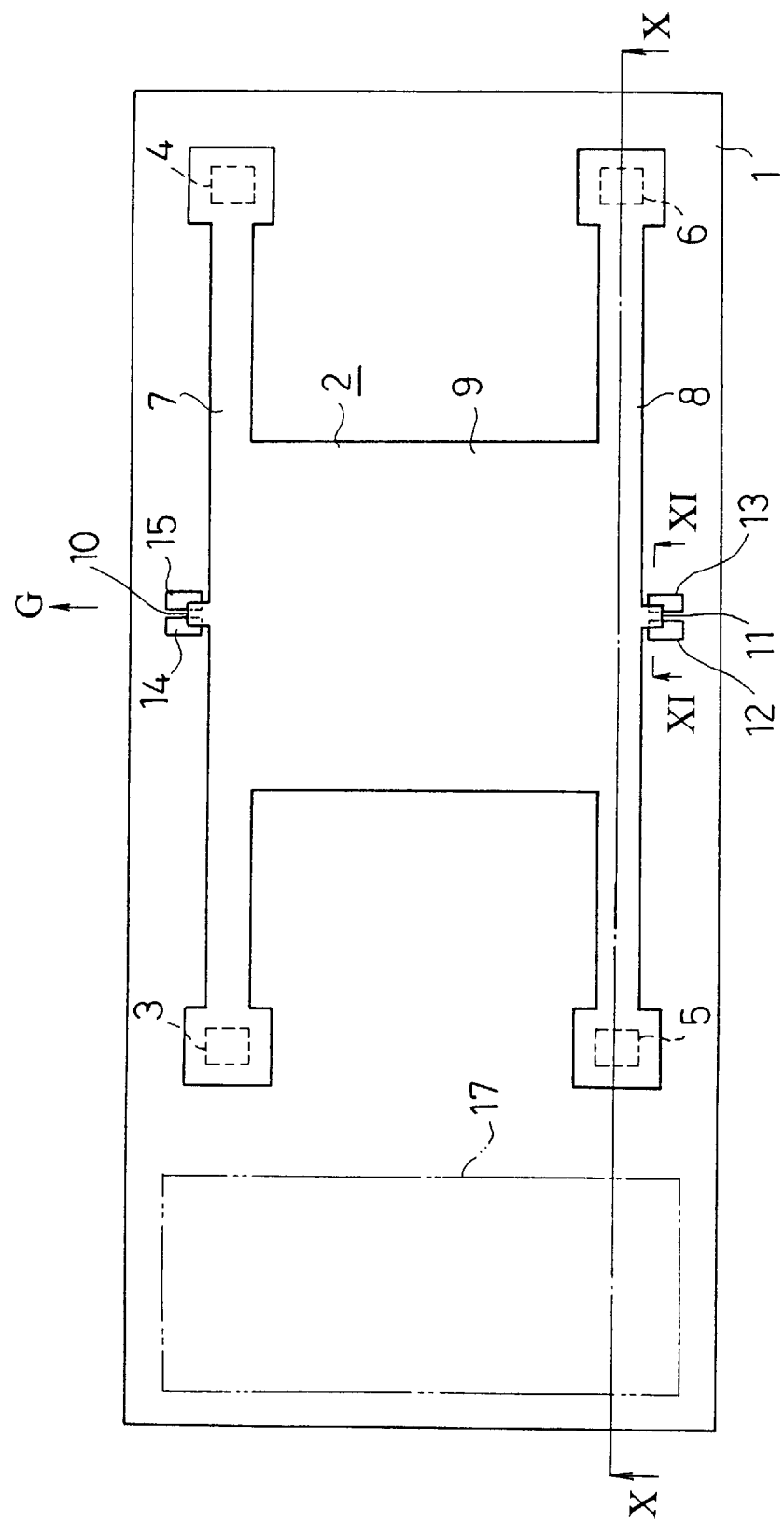
FIG. 9 is a plan view of a semiconductor acceleration sensor according to a third embodiment.
Figure 10:
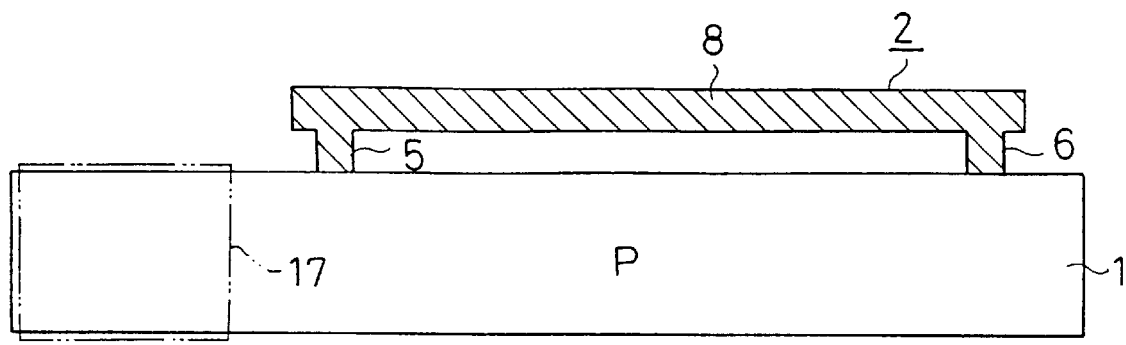
FIG. 10 is a sectional view taken along line X—X of FIG. 9.
Figure 11:
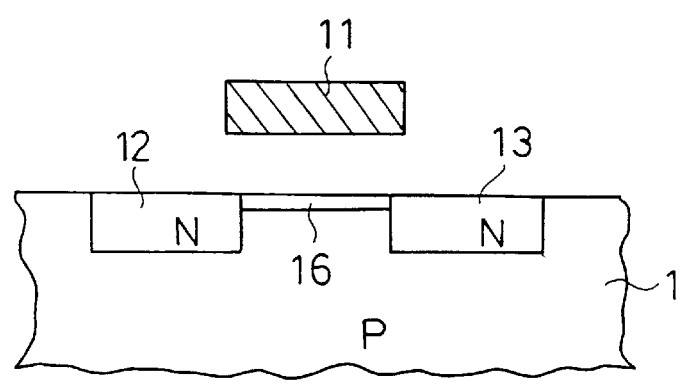
FIG. 11 is a sectional view taken along line XI—XI of FIG. 9.

FIG. 9 indicates a plan view of a semiconductor acceleration sensor according to this embodiment. Additionally, FIG. 10 is a X—X sectional view of FIG. 9, and FIG. 11 is an XI—XI sectional view of FIG. 9.

This embodiment, similarly to the first embodiment indicated in FIGS. 1 to 3, is of a MIS transistor type semiconductor acceleration sensor.

Areas of identical structure with respect to the first embodiment indicated in FIGS. 1 to 3 will be labeled with identical symbols, and descriptions thereof will be omitted. According to the present embodiment, as is shown in FIG. 9, peripheral circuitry 17 is indicated as being formed on the silicon substrate 1. This peripheral circuitry 17 and the movable member 2 are electrically connected and, along with this, the peripheral circuitry 17 and the fixed electrodes 12 to 15 are electrically connected.

Moreover, operation of the acceleration sensor is identical to that described for the foregoing first embodiment.

Next, fabrication steps according to this embodiment will be described utilizing FIGS. 12 to 18.

Figure 12:
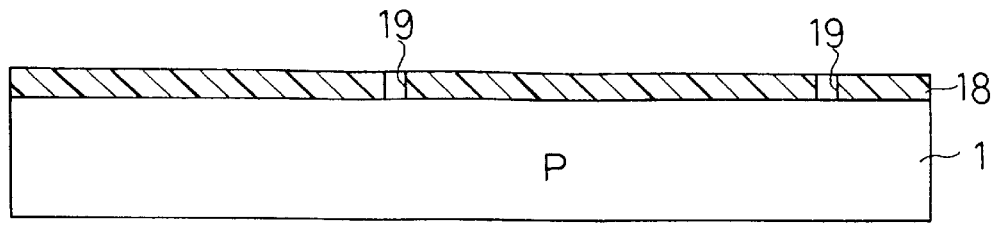
FIGS. 12 to 18 are sectional views for describing fabrication steps of the third embodiment.
Figure 13:
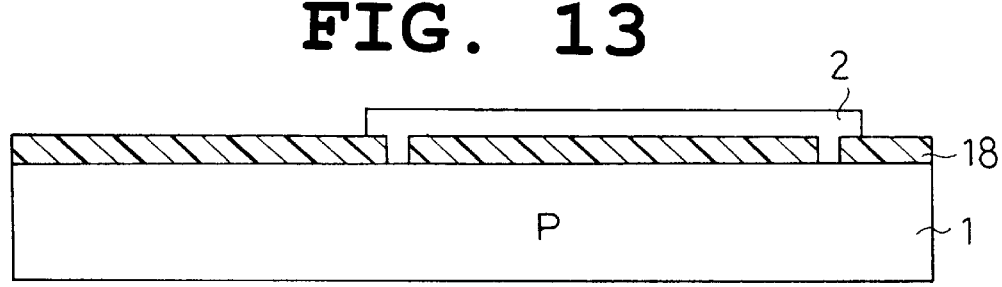

As is shown in FIG. 12, a p-type silicon substrate 1 is prepared and a sacrificial layer 18 composed of silicon oxide film is formed on the silicon substrate 1 by the chemical vapor deposition or spatter process and, along with this, via holes 19 are formed on the sacrificial layer 18 at places which will become anchor sections. Thereafter, as shown in FIG. 13, polycrystalline silicon film which becomes the movable member 2 is deposited on the sacrificial layer 18 and is patterned into the configuration of the movable member 2 indicated in FIG. 9.

Figure 14:
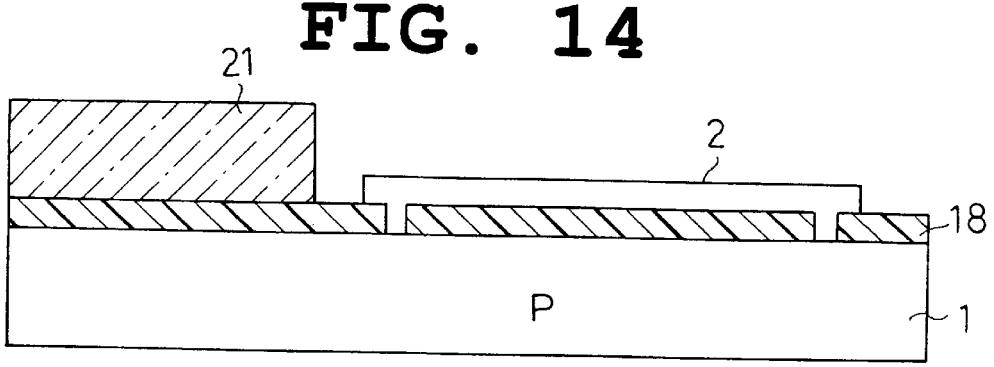
Figure 15:
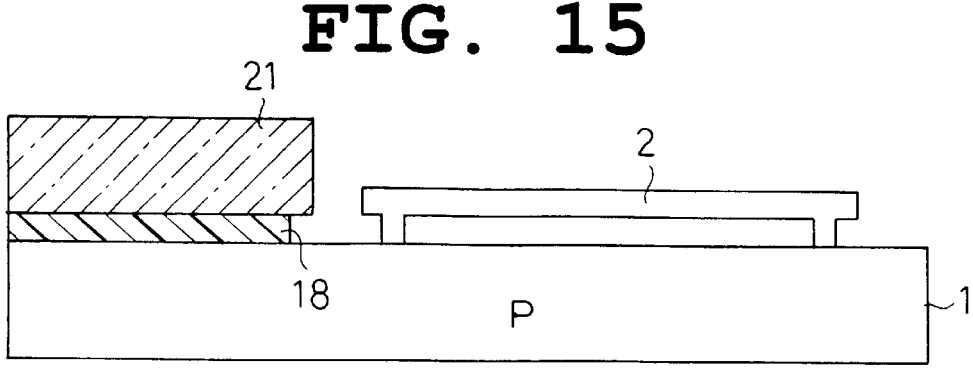

In continuation, as shown in FIG. 14, polyimide film 21 is deposited on the silicon substrate 1 as a mask member, areas on the sacrificial layer 18 where etching is desired are opened, and polyimide film 21 on the peripheral circuitry 17 is allowed to remain. Accordingly, as shown in FIG. 15, the silicon substrate 1 is dipped into hydrofluoric acid-based etching liquid, and the sacrificial layer 18 under the movable member 2 (polycrystalline silicon film) is etched away.

Herein, because the polyimide film 21 offers excellent acid-resisting characteristics, the silicon oxide film (sacrificial layer 18) located beneath the polyimide film 21 is not etched even if exposed to the etching liquid for a lengthy period (30 to 60 minutes). That is to say, the silicon oxide film on the peripheral circuitry 17 is not etched.

Figure 16:
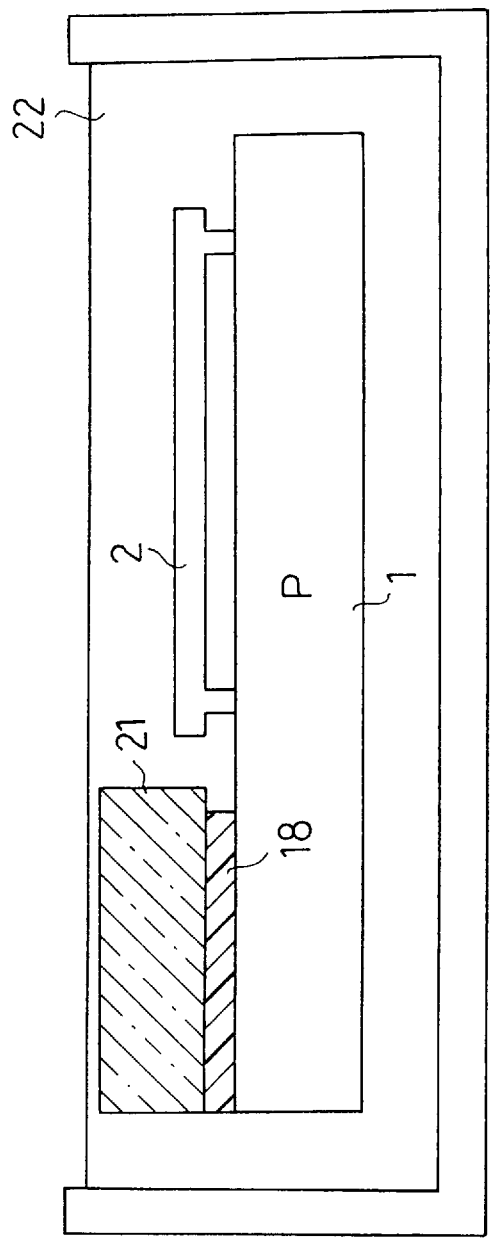

Accordingly, when etching of the sacrificial layer 18 by means of the etching liquid is finished, the silicon substrate 1 is washed in water. Furthermore, as shown in FIG. 16, the silicon substrate 1 is dipped into in paradichlorbenzene 22 as a liquid sublimate material with a melting point of 50 to 60° C., and the demineralized water is replaced with paradichlorbenzene 22. In continuation, the silicon substrate 1 is removed from the paradichlorbenzene 22 and dried at room temperature, causing the paradichlorbenzene 22 to sublimate.

Herein, if it is attempted to dry the demineralized water after replacing the etching liquid with demineralized water, then as shown in FIG. 30 there is a chance of the movable member 2 being drawn toward the silicon substrate 1 by means of surface tension of the demineralized water during drying, leading to destruction of the movable member 2. However, because the etching liquid is replaced, via demineralized water, with paradichlorbenzene which is a sublimate material, and the paradichlorbenzene is caused to sublimate, destruction of the movable member 2 is avoided.

As a result of this, the movable member 2 is disposed at a specified interval above the silicon substrate 1, as shown in FIG. 10.

Figure 17:
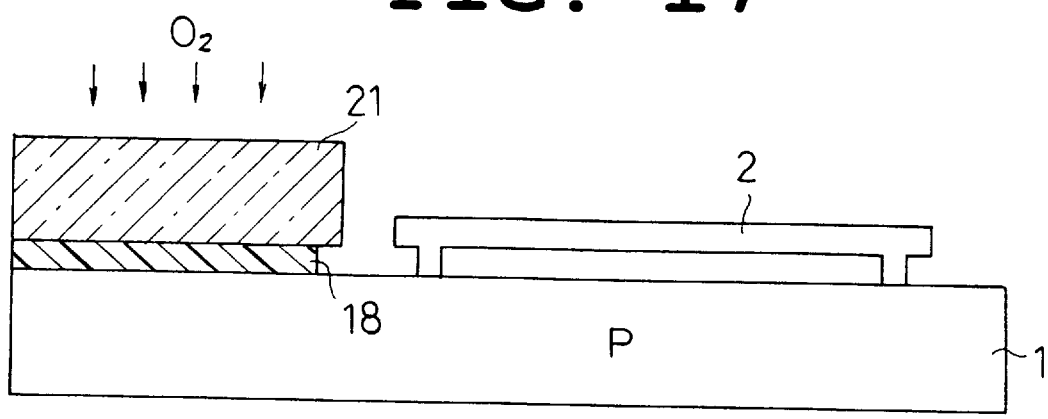
Figure 18:
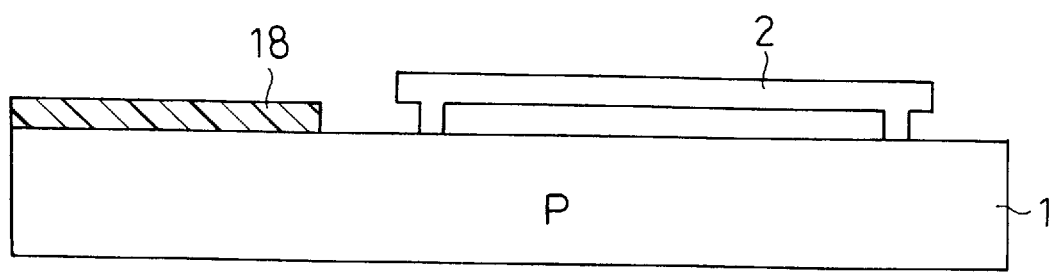

Furthermore, as shown in FIG. 17, the polyimide film 21 is $O_2$-ashed, and the polyimide film 21 is removed as shown in FIG. 18. Herein, if a wet process is employed, then as shown in FIG. 30 there is a chance of the movable member 2 being drawn toward the silicon substrate 1 by means of surface tension of the demineralized water during drying, leading to destruction of the movable member 2 as was described above. However, because the polyimide film 21 is etched by a dry process, destruction of the movable member 2 is avoided.

According to this embodiment, a sacrificial layer 18 is formed on a silicon substrate 1 (semiconductor substrate) and, along with this, a movable member 2 is formed on the sacrificial layer (first step), and a polyimide film 21 (mask member) having acid-resisting characteristics and also etchable by a dry process is disposed in a specified region on the silicon substrate 1 (second step). Accordingly, the sacrificial layer 18 below the movable member 2 is etched by hydrofluoric acid-based etching liquid (acidic etching liquid) in a state of masking by means of the polyimide film 21 (third step). The polyimide film 21 has acid-resisting characteristics and so the region masked by the polyimide film 21 is reliably protected from the acidic etching liquid at this time.

Additionally, the acidic etching liquid is replaced with paradichlorbenzene 22 (sublimate material) and the paradichlorbenzene 22 is sublimated (fourth step). In a case wherein the etching liquid was replaced with demineralized water and dried at this time, the movable member 2 may have been pulled toward the silicon substrate 1 by means of the surface tension of demineralized water remaining between the movable member 2 and silicon substrate 1, thereby destroying the movable member 2. According to this embodiment, however, the etching liquid is replaced with paradichlorbenzene 22 and the paradichlorbenzene 22 is sublimated, and so destruction of the movable member 2 is avoided.

Moreover, the polyimide film 21 is etched by a dry process (fifth step). In a case wherein etching of the polyimide film 21 was performed with a wet process, the movable member 2 may have been pulled toward the silicon substrate 1 by means of the surface tension of demineralized water remaining between the movable member 2 and the silicon substrate 1 when the etching liquid was replaced with demineralized water and dried, thereby destroying the movable member 2. According to this embodiment, however, the polyimide film 21 is etched by a dry process, and so destruction of the movable member 2 is avoided.

In addition, because polyimide is used as the mask member, acid-resisting characteristics are excellent. Furthermore, because paradichlorbenzene is used as the sublimate material, sublimation at low temperature can be performed.

(Fourth Embodiment)

Next, a fourth embodiment will be described with a focus on points of difference from the third embodiment.

In a method of fabrication for a semiconductor acceleration sensor according to the third embodiment, destruction of the movable member 2 is avoided by means of etching the polyimide film 21 with a dry process. According to the present embodiment, in contrast, the polyimide film 21 is etched with a wet process and the etching liquid at that time is washed with water, demineralized water is replaced with paradichlorbenzene (sublimate material), and the paradichlorbenzene is caused to be sublimated.

In a case wherein the etching liquid was replaced with demineralized water and the demineralized water was dried at this time, the movable member 2 may be pulled toward the silicon substrate 1 by means of the surface tension of demineralized water remaining between the movable member 2 and silicon substrate 1, thereby destroying the movable member 2. However, because the etching liquid is replaced, via demineralized water, with paradichlorbenzene and the paradichlorbenzene is sublimated, so destruction of the movable portion is avoided. Consequently, according to this embodiment, it is also possible to perform etching of the polyimide film with a wet process.

(Fifth Embodiment)

A polyimide film 21 as the mask member according to the above-described third embodiment can also be caused to function as a movable member support film according to the first embodiment.

That is to say, according to the present embodiment, similarly to the foregoing first embodiment, a polyimide film 21 is formed with a pattern have etching liquid penetration holes 21 on the movable member 2 as well as on the peripheral circuitry 17.

Thereupon, the sacrificial layer 18 is etched with a hydrofluoric acid-based etching liquid, processing equivalent to that indicate in FIG. 16 is performed, and the replaced paradichlorbenzene 22 is sublimated.

Thereafter, the steps corresponding to those in FIGS. 7 and 8 are performed so as to etch away the polyimide film 21 as the mask member by means of 02 ashing after dicing. Of course, for the etching of the mask member, wet process described in the foregoing fourth embodiment may also be applicable.

When performed in this manner, then in addition to the effects of the above-described third embodiment, the effects of the first embodiment, i.e., the effect of being able to prevent sensor destruction during dicing, can be achieved.

Moreover, in the foregoing third and fourth embodiments, it is also acceptable to perform chip dicing after the step indicated in FIG. 14, and perform the steps indicated in FIGS. 15 to 18 with respect to the respective chips. Destruction of the movable member can be prevented by means of this.

Furthermore, the second aspect of the present invention is not exclusively limited to the foregoing respective embodiments; for example as the sublimate material it is also acceptable to employ naphthalin (melting point: 80.5° C.) instead of paradichlorbenzene. Sublimation at low temperature can be achieved even in a case wherein naphthalin is employed as the sublimate material.

Still further, it is also acceptable to use, as the sublimate material, P-acetylbenzoate (melting point: 206° C.), acenaphthene quinone (melting point: 260 to 261° C.), atropine (melting point: 114 to 116° C.), m-aminobenzoate (melting point: 177.9° C.), 2-aminoanthraquinone (melting point: 302° C.), β-aminoisovalerate (melting point: 217° C.), α-aminoisovalerate (melting point: 305 to 306° C.), 2-amino-p-creosol (melting point: 135° C.), 3-amino-p-creosol (melting point: 157 to 159° C.), 4-amino-o-creosol (melting point: 174° to 175° C.), 5-amino-o-creosol (melting point: 159° to 161° C.), 8-amino-2-naphthol (melting point: 205° to 207° C.), o-aminophenol (melting point: 177° C.), p-aminophenol (melting point: 189.6° to 190.2° C.), alizarin blue (melting point: 268° to 270° C.), 1-anthracene carboxylate (melting point: 246° C.), isatin (melting point: 203.5° C.), quinine (melting point: 177° C.), 2-quinolamine (melting point: 131.5° C.), quinhydrone (melting point: 171° C.), or glyoxym (melting point: 178° C.).

Additionally, as the material of the sacrificial layer, PSG or BSG or BPSG is also acceptable instead of silicon oxide film. Furthermore, as the material of the movable member, amorphous silicon or noncrystalline silicon or monocrystalline silicon is also acceptable instead of polycrystalline silicon. Moreover, as the etching liquid, other acidic etching liquids are also acceptable instead of hydrofluoric-acid based etching liquid.

Still further, the above-described embodiment is of a specific MIS transistor type semiconductor acceleration sensor, but specific embodiment in the differential-capacitance type acceleration sensor indicated in FIG. 20 is also acceptable.

Yet further, according to the foregoing embodiment acidic etching liquid is replaced, via demineralized water, with paradichlorbenzene (sublimate material), but it is also acceptable to replace the acidic etching liquid directly with sublimate material.

Figure 19:
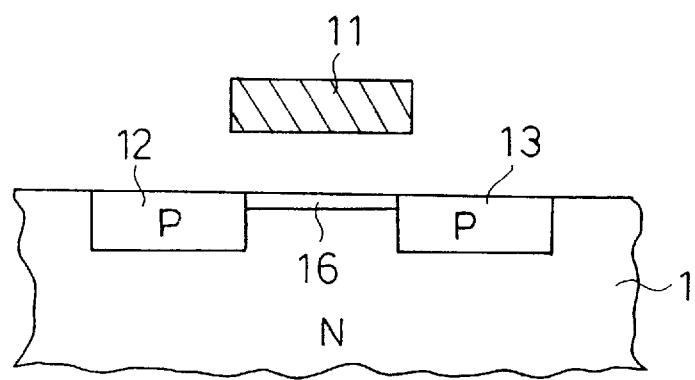
FIG. 19 is a sectional view of a semiconductor acceleration sensor according to another example.

In addition, the foregoing respective embodiments are of n-channel MOS transistors as shown in FIGS. 3 and 11, but as shown in FIG. 19, embodiment in a p-channel MOS transistor is also acceptable.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A method for fabricating a semiconductor acceleration sensor, comprising the step of:
   forming a sacrificial layer on a semiconductor substrate;
   forming an electrode film having a pattern of a movable portion of beam structure on said semiconductor substrate with said sacrificial layer interposed therebetween;
   disposing a movable portion support material on said electrode film so that the movable portion support material is not disposed between said semiconductor substrate and said electrode film;
   etching away said sacrificial layer by means of etching liquid in a state wherein said electrode film is suspended by means of said movable portion support material;
   dicing said semiconductor substrate; and
   etching said movable portion support material by a dry process to cause said electrode film to be a movable portion.

2. A method for fabricating a semiconductor acceleration sensor according to claim 1, wherein said movable portion support material is polyimide.

3. A method for fabricating a semiconductor acceleration sensor according to claim 1, further comprising a step of forming an etching liquid penetration hole of lattice configuration in said movable portion support material, wherein said etching step includes a step of causing etching liquid to penetrate from said etching liquid penetration hole to etch away said sacrificial layer.

4. A method for fabricating a semiconductor acceleration sensor according to claim 1, further comprising:
   replacing, with water, etching liquid adhering to said movable portion after etching of said sacrificial layer; and
   further replacing said replaced water with sublimate material together with sublimating said sublimate material.

5. A method for fabricating a semiconductor acceleration sensor according to claim 4, wherein said movable portion support material is a polyimide.

6. A method for fabricating a semiconductor acceleration sensor according to claim 4, wherein said sublimate material is paradichlorbenzene.

7. A method for fabricating a semiconductor acceleration sensor according to claim 4, wherein said sublimate material is naphthalin.

8. A method for fabricating a semiconductor acceleration sensor according to claim 1, wherein said liquid is acidic etching liquid, said method further comprising:
   replacing said etching liquid with a sublimate material and sublimating said sublimate material.

9. A method for fabricating a semiconductor acceleration sensor according to claim 1, wherein said liquid is acidic etching liquid, said method further comprising:
   replacing said etching liquid with water and then replacing the water with a sublimate material;
   sublimating said replaced sublimate material;
   etching said movable portion support material by means of etching liquid;
   replacing said etching liquid with water and then replacing the water with a sublimate material; and
   sublimating said sublimate material.

10. A method for fabricating a semiconductor acceleration sensor according to claim 8, wherein said movable portion support material is a polyimide.

11. A method for fabricating a semiconductor acceleration sensor according to claim 8, wherein said sublimate material is paradichlorbenzene or naphthalin.

12. A method for fabricating a semiconductor acceleration sensor, comprising the step of:
   forming a sacrificial layer on a semiconductor substrate together with forming an electrode film having a pattern yielding a movable portion of beam structure on said sacrificial layer;
   disposing a movable portion support material having acid-resisting characteristics and which is also etchable by a dry process on said semiconductor substrate so that the movable portion support material is not disposed between said semiconductor substrate and said electrode film to suspend said electrode film on said semiconductor substrate by means of said movable portion support material;
   forming an etching liquid penetration hole of lattice configuration in said movable portion support material;
   causing etching liquid to penetrate from said etching liquid penetration hole to etch away said sacrificial layer;

dicing said semiconductor substrate; and etching said movable portion support material by a dry process to cause said electrode film to be a movable portion.

13. A method for fabricating a semiconductor acceleration sensor according to claim 12, wherein said movable portion support material is a polyimide.

14. A method for fabricating a semiconductor acceleration sensor which comprises a movable portion of beam structure on a semiconductor substrate with a gap interposed therebetween so as to detect acceleration from displacement of said movable portion accompanying the action of acceleration, comprising the step of:

disposing a movable portion support material on said electrode film so that the movable portion support material is not disposed between said semiconductor substrate and said electrode film to suspend said movable portion on said semiconductor substrate;

dicing said semiconductor substrate in a state wherein said movable portion is suspended by said movable portion support material; and etching said movable portion support material.

15. A method for fabricating a semiconductor acceleration sensor according to claim 14, wherein said movable portion support material etching step comprises a dry process.

16. A method for fabricating a semiconductor acceleration sensor according to claim 15, wherein said movable portion support material is composed of thermosetting resin, and wherein said disposing step includes a step of disposing said thermosetting resin on said movable portion at a temperature less than a hardening temperature thereof, and a step of hardening said thermosetting resin at said hardening temperature thereof to thereby support said movable portion.

17. A method for fabricating a semiconductor acceleration sensor according to claim 15, further comprising a step of forming a sacrificial layer between said movable portion and said semiconductor substrate, a step of forming an etching liquid penetration hole of lattice configuration in said movable portion support material, and a step of etching said sacrificial layer causing etching liquid to penetrate from said etching liquid penetration hole.

18. A method for fabricating a semiconductor acceleration sensor, comprising the steps of:

forming a sacrificial layer on a semiconductor substrate together with forming an electrode film having a pattern yielding a movable portion of beam structure on said sacrificial layer;

disposing a movable portion support material on said semiconductor substrate including said electrode film to support said electrode film with said movable portion support film so that the movable portion support material is not disposed between said semiconductor substrate and said electrode film;

forming an etching liquid penetration hole of lattice configuration in said movable portion support material;

causing etching liquid to penetrate from said etching liquid penetration hole to etch away said sacrificial layer;

dicing said semiconductor substrate;

etching said movable portion support material by etching liquid to cause said electrode film to be a movable portion;

replacing adhering etching liquid with water and then replacing the water with a sublimate material; and sublimating said sublimate material.

* * * * *